March 3, 1931. E. L. CONNELL 1,794,881
PHONOGRAPH DRIVE
Filed Sept. 17, 1928
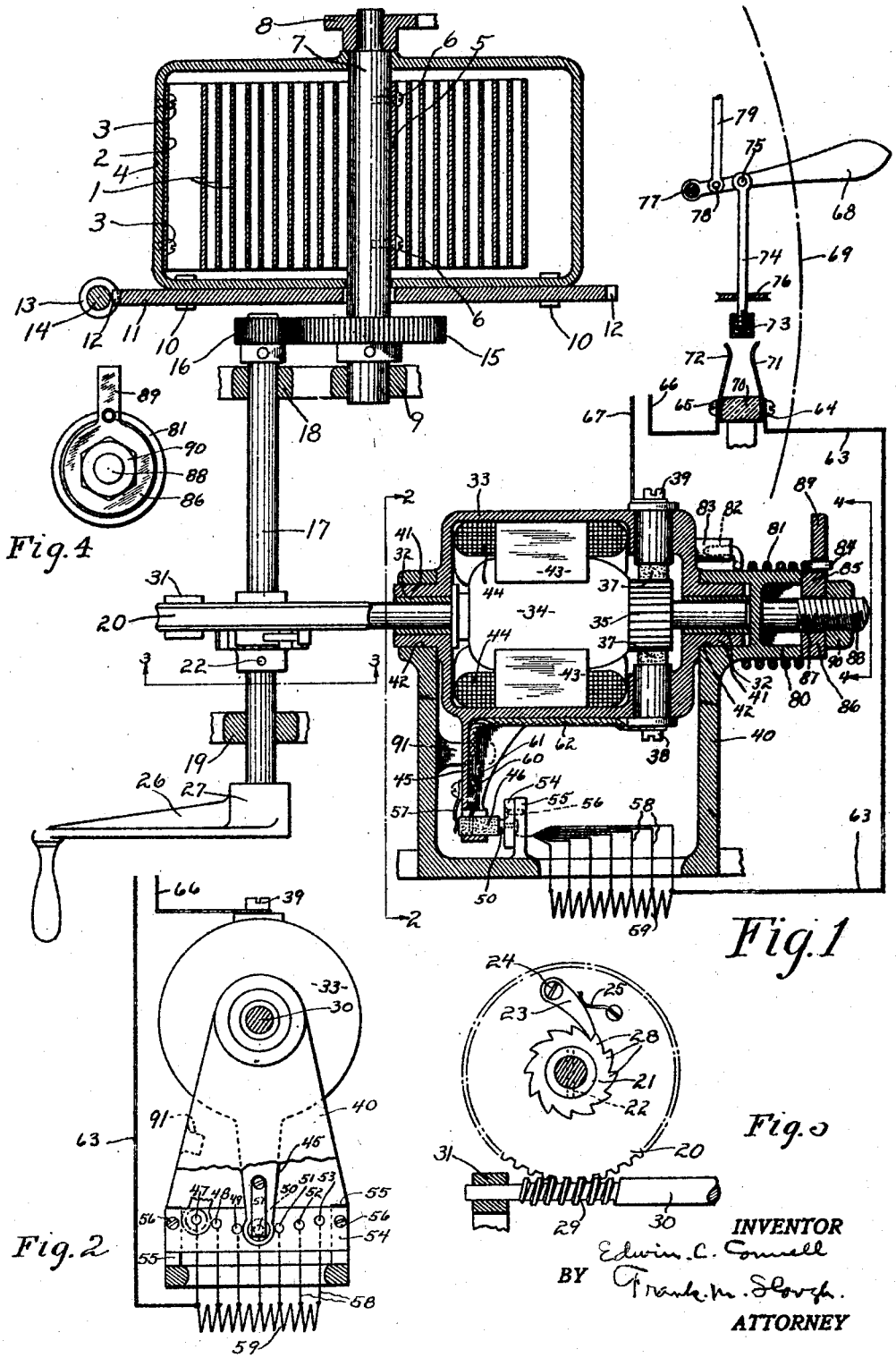
INVENTOR
Edwin C. Connell
BY Frank M. Slough
ATTORNEY Patented Mar. 3, 1931

1,794,881

UNITED STATES PATENT OFFICE

EDWIN L. CONNELL, OF EAST CLEVELAND, OHIO, ASSIGNOR TO THE GENERAL INDUSTRIES COMPANY, OF ELYRIA, OHIO, A CORPORATION OF OHIO

PHONOGRAPH DRIVE

Application filed September 17, 1928. Serial No. 306,326.

This invention relates to driving apparatus and particularly to apparatus for supplying driving power to devices required to be driven at a uniform speed such as phonographs, indicating instruments, etc.

My invention is applicable to a number of kinds of driven devices; but in the concrete embodiment disclosed herein my invention is described as applied to a phonograph to rotatively drive the disk supporting turn-table thereof.

One of the objects of this invention is to provide an apparatus adapted to supply substantially constant driving force, preferably torque, adaptable to drive the rotatable elements of a driven apparatus, such, for example, as the turn-table of a phonograph.

Another object of my invention is to provide an apparatus of the character specified, adapted to supply a substantially constant driving force, or torque, while delivering variable amounts of driving power.

Another object is to provide an apparatus of the character specified, having a storage element in which mechanical energy may be stored, preferably by an electric motor device, and comprising means whereby the motor automatically regulates and varies the rate of its energy output to store energy in the storage element as fast as energy is drawn therefrom, to maintain a substantially constant store of energy in the element.

Another object is to provide an apparatus of the character specified, having an energy storage element in the form of a spring adapted to deliver driving torque to apparatus to be driven and comprising means, preferably an electric motor device, adapted to store energy in the spring and to automatically keep the store of energy therein substantially constant whereby the torque delivered by the spring is maintained substantially constant.

Another object is to provide an apparatus of the character specified in which the energy supplying means, preferably an electric motor device, is adapted automatically to regulate its own torque so that when the storage element has little energy therein the motor will supply energy to it at a high rate and when the storage element is fully supplied or supplied to a predetermined amount, the motor will reduce its rate of energy supply or discontinue the same.

Another object is to provide an apparatus of the character specified above in which energy may be supplied to the storage element by an automatic means, such as an electric motor device, or alternatively at will by a hand operated device such as a crank.

Another object is to provide means whereby the automatic energy supplying means, such as an electric motor device, is caused to discontinue the supplying of energy when the driven device such as the phonograph is "turned off" and to resume its energy supplying function when the driven device is "turned on."

Another object is to provide an apparatus of the character specified above in which the torque limits, within which the energy supplying means, such as an electric motor device automatically confines its torque, are adjustable.

Other objects will be apparent to those skilled in the art to which my invention pertains from the following description of an embodiment thereof, taken in connection with the accompanying drawings illustrative of the embodiment and in which, Fig. 1 is a simplified generally cross-sectional view of an apparatus embodying my invention, some of the parts thereof being broken away, some omitted and some indicated diagrammatically;

Fig. 2, is a cross-sectional view taken from the plane 2—2 of Fig. 1;

Fig. 3 is a cross-sectional view taken from the plane 3—3 of Fig. 1 with some of the parts omitted;

Fig. 4 is an elevational view of a part of Fig. 1 with most of the parts omitted for simplicity and taken from the plane 4—4 of Fig. 1.

At 1—1, I show the convolutions, each of rectangular cross section, composing a spiral spring, the outer end 2 of which is rigidly anchored, as by screws 3, 3 to an enclosing casing 4. The inner end 5, of the spring 1 is rigidly anchored as by screws 6, 6 to a winding shaft 7, rotatably supported at opposite ends thereof in bearing members 8 and 9 which form parts of and are supported upon a main frame, not shown for the sake of simplification, but which may be of any suitable or known construction. The spring enclosing casing 4 is secured by rivets 10, 10 to a power delivering gear 11 coaxial with the shaft 7, the peripheral teeth 12 of which mesh with a spiral gear, worm, or the like 13, mounted on a shaft 14. The shaft 14 may be connected to a driven apparatus such as the turn table of a phonograph directly or through any suitable power transmitting devices such as gears or the like, and inasmuch as such devices are well known it is deemed unnecessary to show and describe them here.

I have, however, indicated at 69 the outer circular edge of the phonograph turn table, and at 68 the starting and stopping lever therefor which will be referred to later.

Upon the winding shaft 7 is rigidly secured a gear 15 meshing with a pinion 16 rigidly secured on one end of a driving shaft 17 which is rotatably supported in bearing members 18 and 19 forming part of the main frame above referred to. The driving shaft 17 is adapted to be turned by a worm wheel 20 through a ratchet wheel 21 having teeth 28, 28 rigidly secured to the shaft as by a pin 22, and a pawl 23 pivoted on the worm wheel 20 at 24 and spring pressed against the ratchet wheel by a spring 25 when the worm wheel 20 is rotated clockwise, as viewed in Fig. 3, (by means to be described) the pawl 23 engaging a tooth 28 of the ratchet wheel 21 turns the ratchet wheel and the shaft 17 with it.

By means of a handle 26, mounted on the shaft 17 by a head 27, the shaft 17 may be alternatively rotated clockwise as views in Fig. 3, by hand, in which case the ratchet wheel 21, turns with the shaft 17, the worm wheel 20 remains stationary and the teeth 28 of the ratchet wheel 21 click under the pawl 23, in a well known manner. For rotating the worm wheel 20, as above described, I provide a worm 29 meshing therewith mounted on or formed integrally with a motor shaft 30 one end of which is rotatably mounted in an outboard bearing 31 forming a part of the main frame above referred to, motor shaft 30 constitutes the main shaft of an electric motor device which will now be described.

The motor shaft 30 rotates in sleeve bearings 32, 32 on the field frame 33, and mounted thereon is the usual armature 34, and commutator 35. The commutator has brushes 37 mounted in the field frame 33 and provided with external connection terminals 38 and 39. The field frame 33 is itself rotatable coaxial with the shaft 30, in a supporting frame 40, the field frame having cylindrical trunnions 41 mounted in bores 42 in the frame 40.

The frame 40 is connected to the main frame of the apparatus above referred to but not shown. The field frame 33 has the usual field poles 43, 43 and field windings 44, 44.

Extending radially from the field frame 33 and movable therewith is a contact arm 45 provided with a contact brush 46, upon rotation movement of the field frame 33 the brush 46 which slides upon a circular series of rheostat contacts 47 to 53 inclusive, mounted upon a panel 54 of insulating material which is supported upon parts 55, 55 rising from the supporting frame 40, and secured to the parts 55 by screws 56, 56. The contact brush 50 is spring pressed upon the contacts 47 to 53 by a spring 57 on the arm 45, and the contacts 47 to 53 are connected by wires 58, 58 to a resistance 59. (This resistance 59 is shown diagrammatically in Figs. 1 and 2 and in Fig. 1 is rotated through ninety degrees for clearness).

The contact brush 46 is provided with a flexible wire 60 the free end of which is connected to an insulated screw terminal 61 (insulation not shown) on the arm 45 which screw terminal is connected one end to an insulated wire 62 and the other end of which is connected to the brush terminal 38.

One end of the resistance 59 is connected by a wire 63 to one terminal 64 of control switch to be described, the other terminal 65 of which is connected to a supply main 66. The other supply main 67 is connected directly to the motor brush terminal 39.

The control switch is adapted to be operated by the starting and stopping lever 68 of the driven device, such as the turntable of a phonograph indicated by the broken line 69. To this the switch may be of any known or suitable construction but in the simplified switch illustrated I have shown a base 70 of insulating material mounted on the main frame above referred to and on which are secured by screws 64 and 65 to resilient stationary contact members 71 and 72. Cooperating therewith is a movable contact member 73 mounted upon the end of and insulated from a switch rod 74. The rod 74 is pivoted to the lever 68 at 75 and guided to have axial movement by the guide 76 mounted on the main frame of the apparatus above referred to. The lever 68 is pivoted at 77 to the main frame of the apparatus. Upon the lever 68 is pivoted at 78 a brake rod 79 adapted to be connected in any suitable manner to the well known brake (not shown) for stopping or releasing the phonograph turntable 69.

When the motor is energized and the armature 34 and field poles 43 react upon each other, the field frame is constrained to rotate through only a predetermined limited arc by means now to be described. Coaxial with the motor shaft 30 is an external cylindrical spring support 80 preferably integral with the supporting frame 40 upon which is carried a helical spring 81, one end 82 of which is anchored in a bore 83 in the field frame 33 and the other end 84 of which is anchored in a hole in an adjusting plate 85. The adjusting plate 85 consists of a circular disc shaped body 86 having a central bore 87 by which it is rotatably mounted on a bearing post 88 which in turn is arranged coaxial with the motor shaft 30 and preferably formed integral with the supporting frame 40. By means of a handle 89 on the adjusting plate 85 extending radially therefrom, the plate may be adjustably rotated on the post 88 and may be secured in any adjusted position by a nut 90 threaded on the post 88 and adapted to clamp the plate 85 against the end of the spring support 80. As will now be understood, the tendency of the field frame 33 to rotate is affected by the force of the spring 81 and the latter is adjustable by the plate 85.

The operation of my invention as above described is as follows:

Let it be assumed that the phonograph driving or energy storage spring 1 is completely unwound and that it is desired to operate the phonograph. To start the phonograph, the starting and stopping lever 68 is moved downwardly, around its pivot 77, as viewed in the drawing, thus operating the holding brake rod 79 to release the brake (not shown) of the turn table 69, and operating the switch rod 74 to bridge the stationary contacts 71 and 72 of the switch. Electric current then flows from supply main 66 through the switch contacts 71 and 72 to wire 63, Figs. 1 and 2, to rheostat contact 47, Fig. 2.

It is to be observed that the brush 46, which is adapted to swing in a circular path over the contacts 47 to 53 is shown in solid lines (Fig. 2) in a central position on the contact 50, which is one of the positions it occupies after the spring 1 has been wound or partly wound and the motor has begun to automatically regulate its torque. At the stage of operations being described the brush 46 is on the contact 47 in the position indicated in broken lines, Fig. 2, being moved clockwise as viewed in Fig. 2 to that position by the torque of the helical spring 81. The path of the current therefore, is from the contact 47 to the brush 46, wire 60, terminal 61, wire 62, terminal 38, brush 37, commutator 35 and armature 34, the other brush 37, terminal 39 and supply main 67. The motor circuit is thus closed energizing the armature over the path described and also energizing the field windings 44, 44, the connections to which have been omitted for simplicity but which may be one of the usual and suitable types of connections employed in commutator motors. The reaction of the armature on the field poles 43, 43 turns the armature and shaft 30 and, as a consequence, turns the worm 29 and worm wheel 20.

By means of the pawl 23 and ratchet wheel 28, torque is transmitted to the shaft 17, pinion 16, gear 15, and winding shaft 7 and winds up the spring 1. The outer end of the spring 1 being anchored to the casing 4, the spring torque is applied to the casing and thence to the gear 11, worm 13 and shaft 14, whence it is transmitted to the phonograph turn table 69 to rotate the same.

The motor armature 34 revolves rapidly and as it winds up the spring 1 the torque developed by the motor gradually increases. When the rising torque of the armature has reached a sufficiently high value, the reaction of the armature upon the field poles 43 exerts thereon a torque greater than that of the opposing spring 81 and turns the field frame 33 on its bearings 41, 41. The contact arm 45 and brush 46 are moved across the row of contacts 47 to 53 inserting in the path of the motor current one or more sections of the resistance 59. This slows down the motor and reduces its torque to a value equal to that of the spring 81 and the brush 46 comes to rest on another of the contacts 47 to 53. The torque of the motor may still be enough to further wind the spring 1 but as it does so the motor torque rises and again moves the brush 46 still farther over the contacts until finally the maximum torque developed by the motor is just equal to the counter torque of the spring 1.

The spring 1 is now fully wound or as nearly fully wound as desired, its condition being predetermined by adjusting the tension of the spring 81 in the manner above described.

From this time on, the motor keeps the spring 1 wound up substantially to the predeterminal degree. Withdrawal of energy stored in the spring tends to reduce the torque required to wind it, which correspondingly reduces the torque demand on the motor and causes it to cut out resistance, and speed up and supply energy to the spring.

The resistance 59 and spring 81 are preferably chosen and adjusted so that at the slowest speed of the phonograph turntable the motor will run with the brush 46 on the last contact 53, Fig. 2, with all of the resistance 59 in the motor circuit. If the phonograph be stopped by moving the lever 68 to the off position, upward in Fig. 1, the motor is also stopped by breaking the current on the switch contacts 71 and 72, the spring 81 returns the brush 46 to the contact 47. If desired a stop 91 on the supporting frame 40 may be provided for the contact arm 45 to prevent overtravel of the brush 46 when the current is turned off.

If the spring is fully wound when the current is turned on to start the phonograph, the brush 46 moves at once over to the regulating position on the contacts 47 to 53.

What I claim is:

1. In an electric motor device for winding the power delivering spring of a power supplying apparatus, automatic means responsive to the winding torque of the spring and operative to insert a resistance in the motor circuit whereby the torque of the motor is variably maintained to maintain the spring wound to substantially a predetermined degree.

2. In an electric motor device for winding the power delivering spring of a power supplying apparatus automatic means responsive to the winding torque of the spring and adapted to operate a controller to variably maintain the motor torque to maintain the spring wound to substantially a predetermined degree.

3. In an electrically operated device for supplying energy to the power spring of a power supplying apparatus, automatic means for reducing the electrical supply to the said device in response to an increase of accumulated energy in the spring and vice versa, whereby the energy supply from the device is variably maintained and the store of energy in the spring is maintained substantially constant.

4. In an electric motor device for supplying energy to the power delivering spring of an apparatus for supplying mechanical power, a movable torque supplying motor element adapted to wind the spring, a second movable motor element, control means whereby movement of the second motor element is adapted to vary the electric supply to the motor device to vary the said torque thereof, and automatic means whereby the said second motor element is caused to move only when the said torque is above or below a predetermined value.

5. In an electric motor device for winding the power spring of a power supplying apparatus, an armature member and a field member reacting upon each other, the armature member being rotatable in one direction and adapted to apply torque to wind the spring, the field member being rotatable in both directions and adapted upon rotation to operate control means to vary the electric supply to the motor to vary the torque of the armature member and automatic means whereby the field is caused to rotate only when the torque is above or below a predetermined amount.

6. In an electric motor device adapted to supply energy to the power spring of a power supplying apparatus, a rotatable motor element for supplying torque, transmission means for applying the torque to wind the spring, a second rotatable motor element, automatic means for preventing the second motor element from rotating except when said torque is above or below a predetermined value, and control means operable by rotation of the second motor element to vary the electric supply to the motor to vary the torque of the first motor element, whereby the spring is maintained wound to substantially a constant predetermined degree.

In testimony whereof I hereunto affix my signature this 1 day of September, 1928.

EDWIN L. CONNELL.